Figure 1:
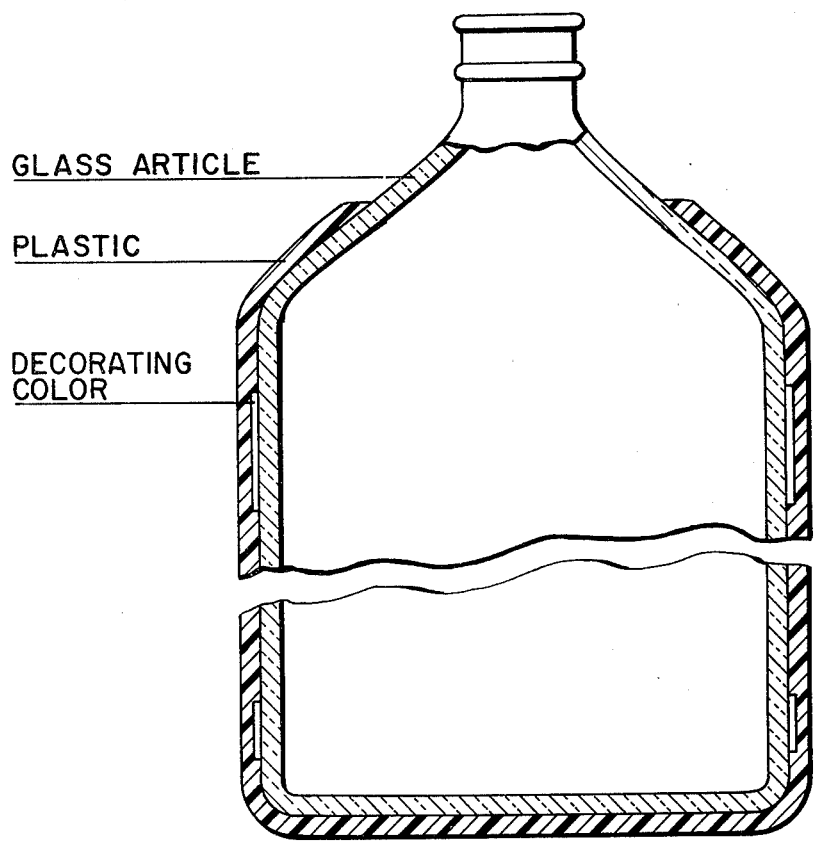

United States Patent [19]
Shank, Jr.

[11] 3,937,853
[45] Feb. 10, 1976

[54] METHOD OF MAKING A COLOR DECORATED, PLASTIC COATED GLASS ARTICLE

[75] Inventor: Herbert C. Shank, Jr., Lancaster, Ohio

[73] Assignee: Anchor Hocking Corporation, Lancaster, Ohio

[22] Filed: July 12, 1973

[21] Appl. No.: 378,493

[52] U.S. Cl. ................ 427/29; 215/12 R; 427/185; 427/195; 427/265; 427/269; 427/282; 427/287; 428/35
[51] Int. Cl.² ...................... B05D 1/06; B05D 1/24
[58] Field of Search ............ 117/18, 21, 26, 29, 38, 117/45, 40, 94, 13, 17, 17.5, 12, 13, 31, 22, 23, 32; 215/1 R, 3.4, 12 R; 40/310; 427/46, 85, 190

[56] References Cited
UNITED STATES PATENTS

| | | | |
|---|---|---|---|
| 1,693,735 | 12/1928 | Warga | 117/3.2 X |
| 2,162,317 | 6/1939 | Rez | 117/38 X |
| 2,324,433 | 7/1943 | Scheetz | 117/40 X |
| 2,502,758 | 4/1950 | Short | 117/3.2 X |
| 2,681,473 | 6/1954 | Carlson | 117/23 X |
| 2,895,846 | 7/1959 | Schaefer | 117/38 X |
| 2,926,101 | 2/1960 | Schaefer | 117/45 |
| 3,007,829 | 11/1961 | Akkeron | 117/3.2 X |
| 3,049,077 | 8/1962 | Damm | 117/38 X |
| 3,089,782 | 5/1963 | Bush et al. | 117/40 X |
| 3,238,053 | 3/1966 | Morgan | 117/18 X |
| 3,274,017 | 9/1966 | Borrajo | 117/3.2 |
| 3,379,559 | 4/1968 | Gerhardt | 117/94 X |
| 3,386,848 | 6/1968 | Dereich | 117/38 |
| 3,502,022 | 3/1970 | Wood | 117/18 |
| 3,504,625 | 4/1970 | Childress | 117/18 |
| 3,513,012 | 5/1970 | Point | 117/29 |
| 3,533,822 | 10/1970 | Bailey | 117/3.4 |
| 3,557,691 | 1/1971 | Bayer | 117/21 X |
| 3,645,778 | 2/1972 | Nesterak | 117/94 |
| 3,770,482 | 11/1973 | Millar et al. | 117/17 |
| 3,805,985 | 4/1974 | Hagiwara | 117/18 |

*Primary Examiner*—William D. Martin
*Assistant Examiner*—Shrive P. Beck
*Attorney, Agent, or Firm*—Wood, Herron & Evans

[57] ABSTRACT

A glass decorating color is applied to a glass article but is not bonded permanently to the glass. A finely divided heat settable plastic material is applied to the article over the impermanently bonded color and onto glass surface areas beyond the area covered by the color. Heat setting of the plastic material, even though insufficient to permanently bond the color itself to the glass, forms a smooth plastic film over the decoration and fixes the color with respect to the glass surface.

18 Claims, 2 Drawing Figures

U.S. Patent  Feb. 10, 1976  3,937,853

METHOD OF MAKING A COLOR DECORATED, PLASTIC COATED GLASS ARTICLE

This invention relates to glass articles to which a plastic coating is applied, and is particularly directed to decoration of such articles with glass decorating colors.

The application of a plastic "skin" or coating on the outside surface of a glass article, especially a glass container such as a carbonated beverage bottle, is useful because it protects the glass surface from the surface abrasion which would otherwise inevitably occur in manufacture, labeling, filling, packing, and/or use. The plastic coating prevents scratching of the underlying glass, which would reduce its strength. The plastic also provides a degree of "cushion" and thereby softens an impact blow which might otherwise cause breakage. Moreover, when applied to a glass container for pressurized beverages, the plastic coating resists scattering of glass fragments if the container is broken.

The plastics used for such coatings are well known in the art. They are referred to herein as finely divided heat settable plastic materials, as distinguished from materials which are applied as sheets or sleeves. As applied to the article, the coating is typically clear and transparent, although it may be colored, or made translucent or opaque, if desired, by including a pigment, coloring ingredient, or opacifier in it.

Such coatings can be applied to glass articles by a variety of coating techniques. According to one coating technique, a heat settable resin in fine particle form is applied by the electrostatic dry powder spray process. The resin particles are electrostatically charged oppositely to the glass article (which acts as a ground) and are projected toward the article by a relatively gentle air current. The attraction of opposite charges draws the charged particles to the article, to which they adhere electrostatically. The glass article is first heated so that it becomes electrically conductive and thereby can act as a ground, and the heat will partially fuse the adhered particles. A final heat setting step is necessary to completely fuse the particles so that they coalesce to form a smooth, continuous coating which is adherent to the glass surface.

In another technique for applying a thin plastic protective coating to a glass article, as described in more detail in Pat. No. 3,060,057, the plastic coating material is in the form of a plastisol or a liquid emulsion of plastic resin droplets in a plasticizer or dispersant. The glass article is dipped in the plastisol bath so the viscous liquid wets the article and thereby coats it. After excess coating liquid has drained, the article is heated to set or harden the plastic film on the glass. The resulting coating is smooth and continuous, and is adherent to the glass surface.

Another well known technique for applying a plastic coating to glass articles is by use of a fluidized bed. The plastic material, comprising finely divided particles of a heat settable resin, is maintained as an aereated or fluidized bed. The container to be coated, heated to a temperature sufficient for at least partial setting of the particles by fusion thereof, is dipped in the bed so that it becomes coated, then is removed and heated at higher temperature to coalesce or set the particles and form a smooth continuous coating.

A related process is the electrostatic fluidized bed process, wherein the fluidized bed of the plastic resin particles is electrostatically charged. When the glass article to be coated (which acts as a ground) is passed through the bed of charged particles, the charge tends to adhere the particles to it. The glass container may be heated for conductivity, but the heating is not sufficient to effect complete fusion of the particles that are adhered to it, and a final heating at higher temperature is used to set the plastic as a continuous smooth coating.

Materials suitable for such coating processes include a variety of finely divided heat settable plastics, including polyethylene, polyvinyl chloride, and ethylene vinyl acetate resins in powder form, plastisols (the resin there being dispersed in a liquid), and other materials. Especially useful are the ionic copolymers of alpha olefins and alpha beta-ethylenically unsaturated carboxylic acids, generally of the type described in Pat. No. 3,264,272. One such ionic copolymer material which is formed from ethylene and methacrylic acid is available commercially from DuPont under their trademark "Surlyn". This material in particular has been promoted in the market by reason of its clarity, its elasticity and its degree of adherence to glass.

In the manufacture of glass articles it is, of course, often desirable or essential to apply a decoration to the article. (As used herein, the term "decoration" is used broadly to mean one or more colors applied to the glasses, including without limitation written or printed language such as a trademark or label, pictures, designs, and the like. The decoration may be translucent, transparent or opaque, including black or white.)

It is requisite that any glass decoration, regardless of its nature, be durably secured in place on the article. That is to say, there must be a degree of adherence between the decoration and the glass surface that is sufficient to withstand the type of handling to which the article will be exposed in use, so that the decoration will not be rubbed off or smeared or chipped in ordinary usage, and will not be partially or wholly removed by whatever type of rinse or detergent wash the article may be expected to encounter in manufacture or filling.

This invention is particularly concerned with those types of decorations which are known in the industry as "glass decorating colors", i.e., organic inks, inorganic colors (such as vitreous frits) and decal type decorations, as distinguished from paper labels and the like, wherein the decoration is applied to a backing or carrier that is glued to the glass. Glass decorating colors typically require heating to above 150° F. to bond permanently to the glass.

Such colors are applied to glass articles by known processes of silk screening, offset printing, and decal applying. As heretofore practiced, each such process has typically required that the decorating color be thermally bondable to glass, and each process has required a heating procedure for permanently bonding the color to the glass surface, so that it will not wash or smear off in further processing or in use. The decorating colors have heretofore included special high temperature activated binders or components by which the coloring ingredients are bonded to the glass. Such thermally activated binders are of course an element of the cost of such colors, and the necessity of activating them is an element of the cost of the overall processing step.

More specifically, the heat activated binder component may be an inorganic ("ceramic") component such as a glass frit (as in the so-called ACL or "applied color labeling" materials) which must be melted at temperatures above at least 800° F. and more typically at 1100°–1200° F. Fusion of the frit binds the coloring ingredients to the article surface. Alternatively, the thermally actuated binder component may be organic, as in the inks used in silk screening and the offset printing technique. An organic ink binder must be bonded by heating to about 350°–500° F.

In the screen decorating process, the decorating color is the form of a viscous paste or slip. This material is applied to delineated regions of the glass article, by being pressed or squeegeed through a stencil in the form of a fine mesh screen which is placed in registry on the surface of the article. When the screen is separated from the article, the color remains on the article in the delineated area, and quickly dries to a chalky or powdery form which is only very loosely adherent to the glass surface. This material is not permanently bonded to the glass surface, and will easily smudge upon the slightest contact or wiping.

In order to durably bond the color to the glass surface, the screen decorated article has heretofore been subjected to a temperature above 800° F., if the color was an inorganic slip, or to a temperature of 350°–500° F. if the color was organic in nature, to bond the color to the surface of the glass article. For inorganic colors, this reheating typically requires a cycle for example of 45–60 minutes duration, and of course involves a capital expenditure and very substantial space requirements for both the heating equipment and conveyors. Moreover, it is a substantial operating cost in terms of fuel cost, article handling and maintenance. A further description of the screen decorating process, which is well known, is given in "The Art of Decorating Glass" by V. H. Remington, published by B. F. Drakenfeld & Co. Inc., Washington, Pa., pages 5–13, to which reference is hereby made.

The offset printing process is generally used to apply organic colors. In that technique, as is known in the art, one or more colors are applied to a printing or offset pad from inking stamps. The colors are then transferred from the printing pad to the glass articles as the pad rolls over the articles. A further description of the offset printing process is given in "A New Offset Process for Glass Decorating" by Sumner W. Raymond, Society of Glass Decorators, papers presented at Second Annual Meeting, 1965, pages 28–30.

Like the screen decorating techniques, the offset printing technique also requires a heating step in order to cure or harden the ink or coloring ingredient on the glass surface. For the inks commonly used, this is done by heating to a temperature in the range of approximately 350° to 500° F.

In the use of thermal release decals for applying color decoration to glass articles, the decorating color is carried on a temporary backing sheet (usually paper), onto which the color layer is adhered by a wax. The color is usually inorganic, i.e., a glass frit which can be fused to the glass article. The side of the color opposite that adhered to the backing sheet is also coated with a layer of the wax or other suitable heat effective adhesive, which permits the color layer to be temporarily adhered to the article prior to permanent bonding. The temperature required to melt the wax or adhesive to release the decal from the backing, and also to temporarily adhere it to the glass surface, is approximately 225° to 300° F. Much higher heating, to a temperature above about 800° F., is required to permanently bond the color to the article. A further description of the decal process for glass decoration is given in U.S. Pat. No. 3,445,309, and in "The Art of Decorating Glass" previously identified, at pages 17-18, to which reference is hereby made.

In each of the aforementioned decorating techniques, the color is impermanently bonded to the glass surface, as initially applied thereto, and it has always been considered necessary to effect a final bonding by heating the decorated article to the higher temperatures needed to form the final bond. Such heating has been done before any further manufacturing operation can be carried out and before the article can otherwise be handled or processed. This fact has imposed a definite limitation and considerable expense, especially where inorganic frit material is applied. As previously stated, frit bonded materials after application and before firing comprise only a powdery or chalky layer which is very easily smudged or smeared or blown off. In order to prevent that from happening, the decorated but unfired article has had to be handled very carefully as the slightest contact could mar the appearance of the image.

This invention is predicated in part upon the concept and discovery that it is possible to apply a plastic coating directly over an unbonded, unfired or impermanently bonded decorated glass article, prior to the application thereto of the heat required to permanently bond the color decoration to the glass surface. Application of the finely divided plastic coating over the unbonded decoration on the glass surface can in fact be carried out without disruption or damage to the latter. The invention is also predicated in part upon the discovery that, instead of carrying out the heating which has previously been necessary to permanently bond glass frit decorating colors to glass surfaces, the color can instead be fixed with respect to the glass by setting the plastic coating, which can be carried out at much lower temperatures than necessary to bind inorganic colors, and that the heating involved in setting the plastic coating may be used simultaneously to bond an organic color decoration.

In accordance with this invention, the decorating color is first applied to the glass surface, but is not fired, so that it remains loosely or imperfectly bonded thereon. The decorating step may be done in any manner suitable to place the color on the surface as by any of the decorating techniques already described, including screen decorating, offset printing, or decal application. In contrast to the past techniques, no separate heat bonding step as has previously been necessary is then utilized to permanently bond the applied decoration to the article, before further processing. Instead, a plastic coating is applied to the article directly over the imperfectly bonded decorating color. The finely divided plastic coating must extend beyond the area covered by the decoration. The plastic is then heated to set it as a smooth continuous film. Permanence of the decoration is achieved by setting of the plastic coating, and the final hardened coating covers and protects the decoration. The coating adds brilliance and depth to the decoration, giving it an appearance it would not display if it were not coated.

It is important to understand that setting of the plastic coating can, in the case of inorganic colors, be carried out at temperatures well below the temperature to which the decoration would have to be heated for permanent bonding. Thus, inorganic ACL type decorating materials must ordinarily be fired above about 800° F.; in contrast, in this invention such high temperatures are avoided altogether and the plastic overcoat can be set at temperatures in the range of 350° to 500° F. In this instance the decoration is never actually bonded directly to the glass; it is fixed in place and protected by the plastic coating over it.

Figure 2:
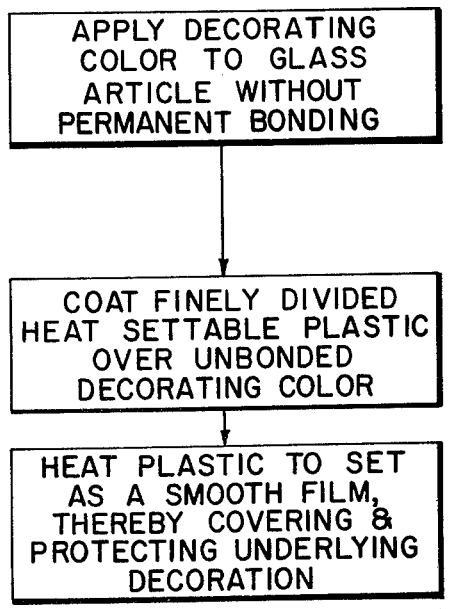

A further description of the invention and its advantages is given in connection with the accompanying drawings, in which:

FIG. 1 is an axial section of a narrow neck glass bottle decorated and plastic coated in accordance with the invention, with the relative thicknesses of the decorating color and the plastic coating greatly exaggerated for purposes of illustration, and FIG. 2 is a flow diagram illustrating in abbreviated form the steps of carrying out a method in accordance with the invention.

The following examples set forth several alternative techniques for carrying out the invention, but they should not be taken as representing the only specific processes for doing so.

EXAMPLE I

This example constitutes the presently preferred method of carrying out the invention for silk screen decoration of a conventional soda-lime glass pop bottle and then applying a coating of the Surlyn resin previously identified.

An ACL glass color constitutes the decorating color. This material includes a glass frit component which fuses at about 1150° F. As coloring ingredients it includes titania and inorganic pigments. Such glass colors are widely used by the industry for conventional silk screen decoration of glass articles, and can be obtained from Drakenfeld, Harshaw Chemical Company, and others. They are supplied and applied in the form of a "slip", which includes a liquid vehicle or squeegee oil that establishes the consistency necessary for application through the screen.

The decorating color is screened onto the container on a conventional screen decorating machine, for example as manufactured by Carl Strutz & Co., Mars, Pa.; Applied Color Equipment Co., Sapulpa, Okla.; and Star Equipment Co., Washington, Pa. The decoration may include a label or trademark, and other printed information, and/or a design. In the application of a single color, the vehicle dries rapidly in air, before the plastic coating is applied. The thus dried decorating color is a chalky or powdery film which is not bonded to the glass and could easily be wiped off. Ordinarily in order to bond this type of decoration permanently to the glass it would be necessary to fire the article at the temperature at which the glass frit would fuse, which would require a temperature of about 1150° F. The frit would then form a hard enamel-like decoration.

In accordance with this invention, however, instead of firing the color decoration, a Surlyn plastic coating is applied directly over the dried but unbonded decoration. The plastic material in powder form is applied by the electrostatic fluidized bed process as described previously, using a "Pherostatic" Coater, produced and sold by Electrostatic Equipment Corporation of New Haven, Connecticut. The bottles are carried on a continuous line by chucks which grip them at the finish (i.e., the cap or closure end portion). The bottles are first carried through an oven and preheated to a temperature of about 150°–360° F. (surface temperature as measured by optical pyrometer). Such heating does not fuse the frit, but is advantageous to improve electrical conductivity of the bottles so that they can act as grounds in the plastic coating step, and to improve the coating thereof by the plastic. The bottles are carried through a "waterfall" or cascade of charged resin particles flowing over the adjacent edges of two spaced parallel fluidized beds. The apparatus is operated at 30,000 to 90,000 volts DC. After removal from the coater the adherent particulate resin particles are then set by heating to form a smooth continuous film. This is done by passing the bottles through a continuous oven, e.g., at a temperature of about 390° to 600° F., for a period of 3 minutes to 45 seconds. The bottles are air cooled to 250°, then quenched by a water rinse to about 200° F. (this prevents hazing of the plastic coating).

In the final product, the decorating color is not fused or adhered directly to the glass, but rather is fixed in position on the glass by the plastic film over it, which is bonded to the glass at least in regions beyond those covered by the decorating color. The plastic coating adds a depth and brilliance to the decoration which an uncoated bottle would not display.

If the plastic coating is carefully removed by stripping or peeling it from the bottle, portions of the decorating color can be seen to be adherent to the plastic film, rather than to the bottle, and tend to come off with the film. Thus, although the decorating color is not bonded to the bottle, the coating protects it so that the decoration will not be removed by the ordinary use of the bottle.

EXAMPLE II

In this example the plastic coating is applied to a screen decorated bottle by the electrostatic dry powder spray process. The screen decoration is applied as in Example I. After the decoration has been screened on, the bottles are preheated to a temperature of about 300°–360° F. (surface temperature as measured by optical pyrometer), in order for the resin particles to adhere optimally prior to setting. The resin is sprayed with a DeVilbiss Model No. 348 dry powder spray apparatus, operated at 60 kv DC output. The sprayed, charged particles adhere to the grounded bottles and partially fuse upon contact. The adherent particulate material is then fused to a clear, smooth, continuous film by heating the bottle in an oven to a peak temperature of 390° F., over a three minute period and then cooling.

If the plastic coating is carefully cut and peeled away from the bottle, it is found again that the decorating color is not bonded to the bottle, but is fixed in place and protected by the plastic coating over it.

EXAMPLE III

As another alternative to the electrostatic fluidized bed coating procedure or the dry powder spray process referred to in Examples I and II, the plastic coating may be applied over the imperfectly bonded decorating color by the plastisol dip process. Plastisols for glass coatings are available commercially; one example is the polyvinyl chloride plastisol which is commercially available from G & S Plastics Company of Cleveland, Ohio, under the designation Plastisol 2342.

Since the plastisol is a liquid material, as opposed to the dry plastic materials of Examples I and II, the decorating color used should be one which will not be dissolved or adversely affected by contact with the plastisol; in a given instance, this is easily determined by simple test. Nonetheless, the color need not be permanently bonded to the glass surface prior to application of the plastisol. Indeed, this fact provides an operating and economic advantage in that inclusion of bonding ingredients necessary for permanent bonding which would increase the cost of the decorating color, and special heating steps necessary to cause such bonding are unnecessary and can advantageously be omitted.

The plastisol is coated onto the bottle, to which the color has been applied, by dipping the bottle in a bath of the plastisol. After draining, the plastic is set by heating to dry the film; by way of example, the plastisol identified above is placed in an oven at about 480° F. for 6 minutes, and then cooled in air. The decorating color, which is not itself permanently bonded to the glass, and which otherwise would soon be smeared or removed in use, is protected by the set plastic coating, so the color will not be removed during ordinary handling. The resulting coating is smooth and clear and imparts a high degree of brilliance and depth to the decorating color.

EXAMPLE IV

An organic color ink may be used as the decorating color instead of an inorganic or so-called ceramic color. Such glass decorating inks are readily available from commercial sources as identified above, and can be applied by conventional screen decorating techniques and offset printing. In order to bond to the glass, such inks must ordinarily be heated to about 350° F. (Such organic ink decorating colors are by nature not as permanent as ceramics or ACL type colors, nonetheless they are widely used for certain purposes such as labeling containers for dried foods, etc.) Since the plastic coating itself will protect and cover the decorating color, it is not necessary actually to bond the ink to the glass before applying the coating. Moreover, binder components as are presently included to provide permanence of color in use can be omitted or modified, it only being necessary that the color (whether organic ink or ceramic) adhere sufficiently to the glass to permit the plastic coating to be applied over it.

The plastic coating may be applied over the ink by any of the techniques previously described.

EXAMPLE V

In this example the bottle is decorated with a conventional thermal release decal. The decal color is a glass frit which requires firing at about 1100°-1200° to be bonded permanently to the glass. This color is temporarily adhered to a paper backing by a wax which melts at about 250°-300° F. A layer of wax also covers the side of the color layer that will be placed toward the glass, and is used to temporarily adhere the color to the glass. Such decals are commercially obtainable from The Meyercord Co., Carole Stream, Ill. When the decal, on its backing, is placed in contact with the bottle and heated to the release temperature, it is simultaneously temporarily affixed to the container as it is released from its backing. The wax adhesive provides temporary positioning but does not permanently bond the color to the glass surface (which ordinarily would require heating to a temperature of 1100°-1200° F. in order to fuse the glass frit binder). By this invention such a permanent direct bonding step is avoided and the plastic coating is used to cover and protect the decal.

The plastic coating is applied directly over the wax adhered decal, for example by any of the coating techniques of Examples I–III. As in those examples, the coating extends onto the glass surface in regions beyond those covered by the decal, and when the coating is set as a smooth continuous film, the decal is covered and protected by it. The wax or thermal decal adhesive which would not otherwise provide adequate permanence, suffices here because of the protective coating which itself is affixed to the decal which in turn adhered to the glass surfaces around the edges of the decal. From the foregoing, it will be appreciated that decals for this use need not have glass frit colors, but may be of other colors which would otherwise be too impermanent for use.

EXAMPLE VI

In this example a decoration is applied by means of the offset printing process. For this purpose a conventional organic ink decorating color may be used, as referred to in Example IV. The ink is applied using a "Markem" offset printing machine in accordance with the conventional offset printing process referred to above. The decorating color is protected for use by reason of the application and setting of a plastic coating over it, which may be done for example by any of the coating techniques above described.

EXAMPLE VII

It should be understood that the invention is not limited to single color decorations. Where two or more colors are to be applied, as by silk screening or offset printing, it will be necessary that the first colors be adhered to the article sufficiently to permit the final color to be applied over them--they do not necessarily have to be bonded permanently onto the article, since the ultimate protection will be provided by the plastic coating.

For a multi-color decoration, it is desirable to use a heated screen and hot melt decorating colors, for very rapid drying of all colors prior to the last color, in accordance with known decorating processes. The final color is then applied by screening on an ACL color or an ink. The plastic coating can be applied over the impermanently bonded colors, and will protect all three.

While it will be understood that the foregoing examples illustrate various details of embodiments of the invention in order that others may practice the same, it will be understood that the invention is not limited to utilization of these specific techniques set forth therein, but may be carried out in accordance with other techniques within the scope of the following claims.

I claim:

1. A method of permanently decorating a glass container comprising,
    applying to an outside surface region of a preformed glass container a glass decorating color which requires heating to a temperature higher than about 150° F. to bond permanently to the glass surface,
    then, prior to heating said container with the said decorating color thereon to a temperature effective for such permanent bonding to occur, coating a finely divided heat settable plastic onto said glass container, the said plastic being coated over the applied color and extending on said glass surface beyond the surface region on which said color has been applied, then anchoring said plastic to said glass container by heating the decorated and thus coated container to set the plastic so that it forms a smooth continuous film, and cooling the container, the resultant plastic film being supported by and anchored to the surface of said glass container at least over the region beyond that covered by the said decorating color, thereby producing a final permanently decorated glass container wherein said film provides a permanent outer covering over said decorating color which encloses and protects the latter on the glass surface, the decorating color being captured between the film and the glass surface and not extending to the outside surface of said film.

2. The method of claim 1 wherein said plastic is set by heating to a temperature below the temperature necessary for said decorating color to be permanently bonded to said glass surface, the decorating color being held in place on said glass surface by the plastic film over it.

3. The method of claim 2 wherein said decorating color is an inorganic screen decorating color which must be heated to a temperature above the temperature at which said plastic is set, to be bonded permanently to said glass surface, and which remains unbonded to the glass under the plastic film.

4. The method of claim 1 wherein said decorating color includes a glass frit component which must be melted at a temperature above 800° F. in order for said decorating color to be permanently bonded to said glass surface, and wherein said plastic is set at a temperature below the temperature necessary to cause said frit component to be permanently bonded to said glass surface, the decorating color being fixed with respect to the article by the plastic film.

5. The method of claim 1 wherein said decorating color is an organic ink and is permanently bonded to the glass surface during the same heating of the plastic coated article by which the plastic is set.

6. The method of claim 1 wherein said decorating color is applied by a silk screen decorating process.

7. The method of claim 1 wherein said decorating color is applied by offset printing.

8. The method of claim 1 wherein a multiplicity of differently colored decorating colors are applied to said container sequentially, all such sequentially applied colors but the last being permanently bonded to the container before the last color is applied, the last such decorating color being imperfectly bonded when said plastic is coated over it.

9. The method of claim 8 wherein all of the decorating colors but the last to be applied are thermoplastic, and wherein the last to be applied is a ceramic which requires heating to a temperature of at least 800° F. to become durably bonded to the glass surface, and wherein said ceramic is not heated to a temperature sufficient to bond it to the glass surface, all of the decorating colors being sandwiched with respect to the glass surface by the resulting plastic film over them.

10. The method of claim 1 wherein said plastic is a resin in finely divided discrete particle form.

11. The method of claim 10 wherein said plastic is an ionic copolymer of an alpha olefin and an alpha-beta olefin.

12. The method of claim 1 wherein said plastic is a plastisol.

13. The method of claim 1 wherein said plastic is heat settable at a temperature between about 350° and 500° F.

14. The method of claim 1 wherein said coating is carried out by the electrostatic fluidized bed process, the article, with the decorating color applied to it but imperfectly bonded thereon, being coated as it passes in proximity to a fluidized bed of particles of said plastic which particles are electrostatically charged oppositely from said article.

15. The method of claim 1 wherein said container is heated after said decorating color has been applied to it, such heating being sufficient for said container to be rendered conductive for said coating to be applied by an electrostatic process but insufficient to permanently bond said decorating color to said container.

16. The method of claim 1 wherein said plastic is a finely divided resin and is applied by an electrostatic dry powder spray process.

17. The method of claim 1 wherein said plastic is a plastisol, said article being dipped into a bath of said plastisol after said decorating color has been applied to said surface region and while said decorating color is impermanently bonded to said glass surface.

18. A method of permanently decorating a glass container comprising, applying to a surface region of a preformed glass container a glass decorating color which is not bonded permanently to the glass surface, then coating a finely divided heat settable plastic onto said glass container, the said plastic being coated over the unbonded applied color and extending on said glass surface beyond the surface region on which said color has been applied, then heating the thus coated container to set the plastic so that it forms a smooth continuous film which is anchored to the container, and cooling the container, the resulting plastic film being supported by and adherent to the surface of said glass container at least over the region beyond that covered by the said decorating color, the unbonded decorating color being covered and protected by the plastic film, thereby producing a final permanently decorated glass container wherein said film provides a permanent outer covering over said decorating color which encloses and protects the latter on the glass surface, the decorating color being captured between the film and the glass surface and not extending to the outside surface of said film.

* * * * *